(12) United States Patent
Kritzer et al.

(10) Patent No.: US 8,691,358 B2
(45) Date of Patent: Apr. 8, 2014

(54) COMPONENT PROVIDED WITH A MACHINE-READABLE IDENTIFICATION

(75) Inventors: Peter Kritzer, Forst (DE); Kurt Ewald, Frankenthal (DE); Christian Geubert, Zwingenberg (DE); Thorsten Wieland, Weinheim (DE); Jan Helms, Budapest (HU)

(73) Assignee: Carl Freudenberg KG, Weinheim (DE)

( * ) Notice: Subject to any disclaimer, the term of this patent is extended or adjusted under 35 U.S.C. 154(b) by 254 days.

(21) Appl. No.: 12/944,878

(22) Filed: Nov. 12, 2010

(65) Prior Publication Data

US 2011/0059297 A1    Mar. 10, 2011

Related U.S. Application Data

(63) Continuation of application No. PCT/EP2009/003745, filed on May 27, 2009.

(30) Foreign Application Priority Data

May 29, 2008  (EP) .................................. 08009812

(51) Int. Cl.
*B32B 1/00*    (2006.01)

(52) U.S. Cl.
USPC .......................... 428/66.6; 411/531; 428/64.1

(58) Field of Classification Search
USPC .................. 428/66.6, 64.1; 411/531
See application file for complete search history.

(56) References Cited

U.S. PATENT DOCUMENTS

| 6,001,459 | A | 12/1999 | Mahn, Jr. | |
| 6,089,455 | A | 7/2000 | Yagita | |
| 6,845,983 | B1 | 1/2005 | Suggs et al. | |
| 7,353,994 | B2 | 4/2008 | Farrall et al. | |
| 2004/0111178 | A1* | 6/2004 | Saarela et al. | 700/193 |
| 2004/0217173 | A1* | 11/2004 | Lizotte et al. | 235/462.01 |
| 2005/0145131 | A1 | 7/2005 | Takido et al. | |
| 2005/0189408 | A1 | 9/2005 | Corbett | |
| 2005/0282955 | A1 | 12/2005 | Apostolo et al. | |
| 2006/0091214 | A1 | 5/2006 | Hyde et al. | |
| 2007/0252006 | A1 | 11/2007 | Heck et al. | |
| 2008/0122704 | A1* | 5/2008 | King | 343/702 |
| 2008/0148910 | A1* | 6/2008 | Chiu | 81/488 |

FOREIGN PATENT DOCUMENTS

| CN | 1920286 A | 2/2007 |
| EP | 1475238 A4 | 3/2005 |
| EP | 1354304 B1 | 7/2006 |
| JP | 2000346084 A | 12/2000 |
| WO | 2006089247 A3 | 2/2007 |
| WO | 2007130968 A3 | 11/2008 |

OTHER PUBLICATIONS

Rubber Fab Technologies Group, "Laser Engraved Gaskets" (2004) #RF-195.
Rubber Fab Technologies Group, "Hygienic Seal Material Guidelines" (2004)—rev. Aug. 2005, #RF-140.

* cited by examiner

*Primary Examiner* — Brent O'Hern
(74) *Attorney, Agent, or Firm* — Harness, Dickey & Pierce, P.L.C.

(57) ABSTRACT

Component (1) having at least one element (2) having a curved surface (3), wherein the element (2) is provided with a coded, electronically readable identification (4), which is introduced into the surface as a topographic identification (4), wherein the identification (4) is embodied in such a way that it can be read in two dimensions by means of a reader.

19 Claims, 7 Drawing Sheets

COMPONENT PROVIDED WITH A MACHINE-READABLE IDENTIFICATION

CROSS-REFERENCE TO RELATED APPLICATIONS

Figure 1:
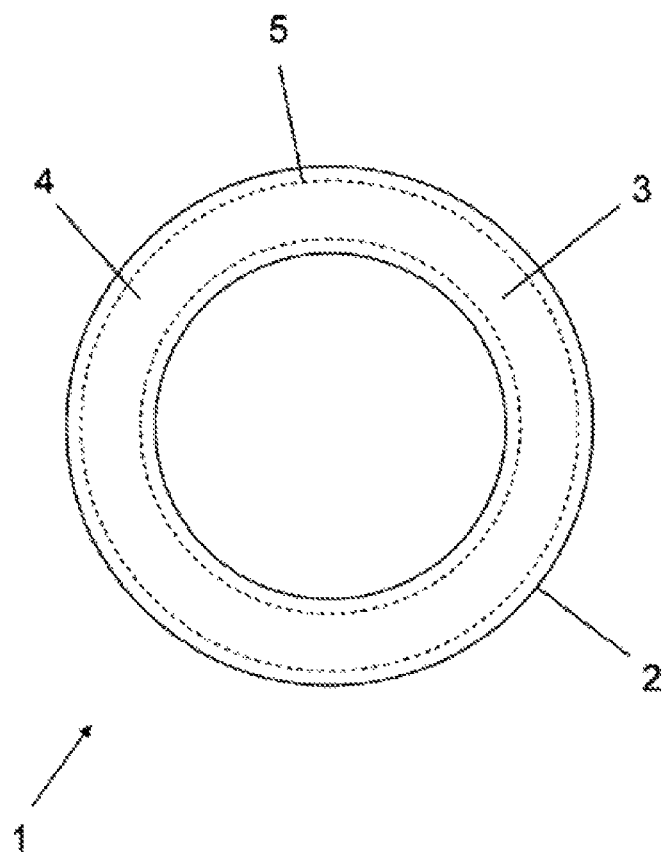

This application is a contination application of International Application No. PCT/EP2009/003745, filed May 27, 2009 (now WO2009/144011, published Dec. 3, 2009); which claims priority to European Application No. 08009812.2, filed May 29, 2008. The entire disclosures of each of the above applications are incorporated herein by reference.

FIELD

The present disclosure relates to a component with at least one element with a curved surface, whereby the element is provided with a coded, electronically readable identification that is introduced as a topographical identification into the surface.

BACKGROUND

This section provides background information related to the present disclosure which is not necessarily prior art.

Such components are known from EP1354304B1. It describes a process for identifying components by applying a marking in a manner secure against falsification. For this, a label with detectible particles is provided that are distributed in a random pattern on the label. These particles are detected by an optical system and stored and can be unambiguously re-assigned by being repeatedly read out. For example, the marking of a tire by a label is described. Even in the case of machine elements the security against falsification and the reproducibility of the manufacture are becoming more and more important, since, for example, falsified, low-quality seals can prematurely wear out or not even achieve the required sealing action and can thus cause immense damage. Furthermore, an identification offers advantages in production control, logistics and accounting. Therefore, the information stored in the identification should be present in a multiply redundant manner. Redundant means that the information is contained multiply and in different forms in the identification in order that the reading out of the identification is possible even if a large part of the identification has been destroyed, for example, by wear and tear on the component. The problem with small components with a curved, for example, toroidal surface is to apply a plurality of information in a multiply redundant manner on the component in such a manner that the identification can be read out with customary readers.

SUMMARY

This section provides a general summary of the disclosure, and is not a comprehensive disclosure of its full scope or all of its features.

The invention is based on the problem of further developing the identification in such a manner that it can be readily read out in spite of a plurality of multiply redundantly stored information and can be applied on small surfaces.

In order to solve the problem the identification is formed in such a manner that it can be read out in two dimensions with a reader. To this end the identification is formed in such a manner that it is supplied on a curved surface and preferably arranged in the regions in which no distortion or only a slight distortion occurs in a two-dimensional projection. As a result, the identification can also be read out with traditional readers, that is, designed for areal surfaces and it is not necessary to distort the identification by computer processes. The identification advantageously follows the surface in an area with low distortion.

The identification can have a non-rectangular shape. This results in a plurality of forms that result primarily on the shape of the component to be identified. The identification can be circular, ring-shaped or assume any desired shape. The identification can have an uneven limiting edge. Such an identification can have a ragged limiting edge or limiting edge with a freehand line.

The identification can be divided into segments. To this end the coded symbols contained in the identification are divided up and arranged in several segments. The complete identification results after reading out all segments or according to the redundancy of a part of the segments. The identification can be applied in a great plurality of forms onto the component by the division into segments. As a result, even sharply curved components can be provided with an expressive and redundant identification since the segments can be arranged in a distributed manner. The segments can have a rectangular shape, whereby a non-rectangular total form of the identification results by the arrangement of the segments to an identification. The segments can also have dimensions that deviate from each other.

The segments can directly border each other or be distanced from each other. The segments can be offset from each other or aligned rotated toward each other. If the segments are offset relative to each other, this results in stepped structures, whereby the segments directly border on each other or can be distanced from each other. As a result of the stepped offset, round or other non-rectangular structures can be simulated. If the segments are rotated toward each other, that is, tilted, the segments can be arranged, for example, on ring-shaped components, whereby almost the entire surface, that can be projected in two dimensions with only slight distortions, can be used for the identification and can also be readily read out.

The identification can contain individual readable symbols that can be arranged offset from each other. The symbols can be arranged alternatively or additionally around a common middle point. Basically, the same applies to the symbols as to the previously described segments. In this case it is not necessary to divide the identification into individual segments but rather the symbols can be offset and rotated inside the identification. However, it is also conceivable to offset and rotate the symbols inside the segments.

The identification can extend over several elements of the component. In the case of composite parts consisting of several materials this increases the security against falsification since several elements are characterized. For this, the identification can be divided up into segments, whereby the segments are distributed over the elements. The complete identification results after the reading out of the individual segments distributed over the elements.

The element can be an O-ring or the elastomeric section of a sealing element. The identification can be introduced into a functional surface of the element. It is necessary in particular in the case of sealing components to characterize their non-metallic constituent. Seals frequently consist of a sealing material-metal composite, whereby original metallic parts can be reused for falsified products. Therefore, it is not purposeful to identify only the metallic part but rather to identify the element consisting of sealing material that is responsible for the sealing function, is significantly more critical and more susceptible to wear, and also to identify the functional surface, if necessary. It was surprisingly determined that the function of a seal is not adversely affected if a functional surface is provided with a laser marking that is applied on the surface and brings about a removal of material. In particular, it turned out that components characterized in accordance with the invention also satisfy increased hygienic requirements and that no inadmissible germ growth takes place in the identification. Seals characterized in this manner can be designed in particular as sealing rings with different cross sections, radial shaft sealing rings, flat seals or valve shaft seals. In particular in the case of O-rings and comparable sealing elements it is advantageous to be able to introduce the identification into a functional surface since it can not be determined in advance in the case of O-rings which surface section is essential for the sealing surface after assembly. However, it is also conceivable to introduce the identification into a surface that is aligned obliquely, that is, aligned neither axially nor radially. According to experience, this surface is subjected to the lowest loads.

Conceivable materials for the component are preferably rubbery materials, elastomers, thermoplastic elastomers, thermoplastic polyurethanes or polytetrafluoroethylene. However, the component can also be designed as a metal seal, for example, as a cylinder head seal. The identification, that is introduced as a topographic identification into the depth of the material of the element, carries data about the product, the manufacturer and other information in coded form. The coding permits the identification as well as security against falsification of the component and an unambiguous association of the component with the manufacturer as well as, optionally, information about production charges, whereby each individual component can be provided with a continuous series number. Therefore, the identification forms a real-time feature. The identification is preferably introduced into the element by working with a laser since the laser marking is applied directly onto the component and as a result the material itself is marked. The laser treatment brings about a removal of material to a pre-selected depth. Therefore, it is not possible to remove the marking from the component without damaging the component. Furthermore, it is advantageous that the laser marking takes place without contact and as a result no deformation of the component with a consequential following falsification of the identification can occur. Furthermore, the identification is supplied on the finished product subsequently to the manufacture. Therefore, manufacturing data such as the manufacturing date and charge number as well as other quality features can subsequently be applied onto the component as further information. The laser marking is applied on the surface and can therefore be applied and detected in an especially simple manner. Furthermore, no foreign material is introduced into the component that could be released and could bring about undesired effects. The identification can be read out with comparatively simple optical means. In particular, compared to electronic identifications such as, for example, integrated memory devices the optical identification by a laser is cost-effective and therefore also suitable for economical mass components. The optical identification is suited also in particular for the identification of curved, three-dimensional surfaces. Conceivable components that can be provided with the identification in accordance with the invention are, for example, radial shaft sealing rings, O-rings, X-rings, quad rings, rubber bellows, membranes, hydraulic seals, pneumatic seals and similar components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
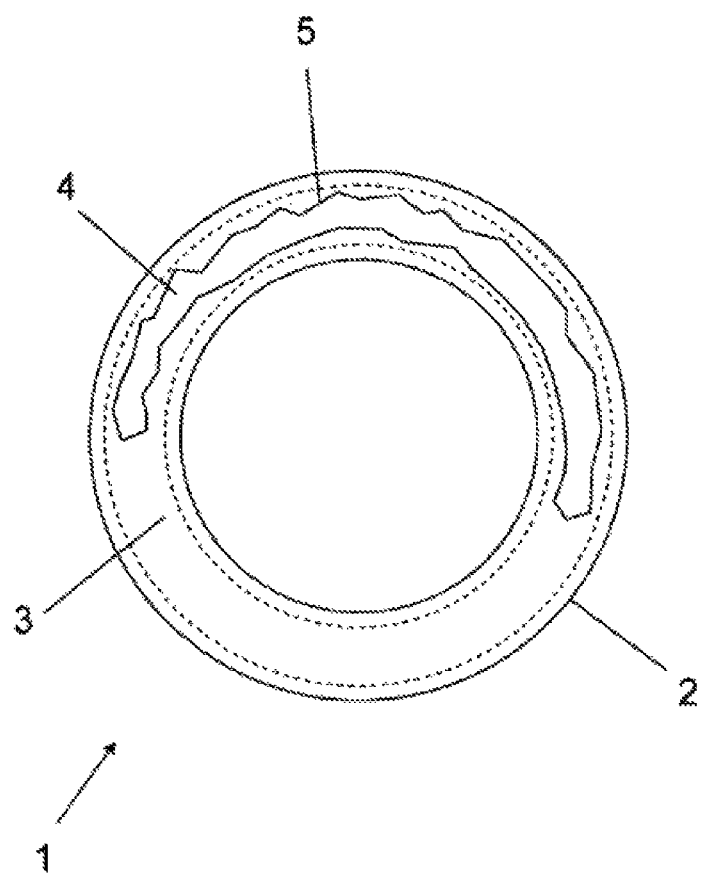
Figure 3:
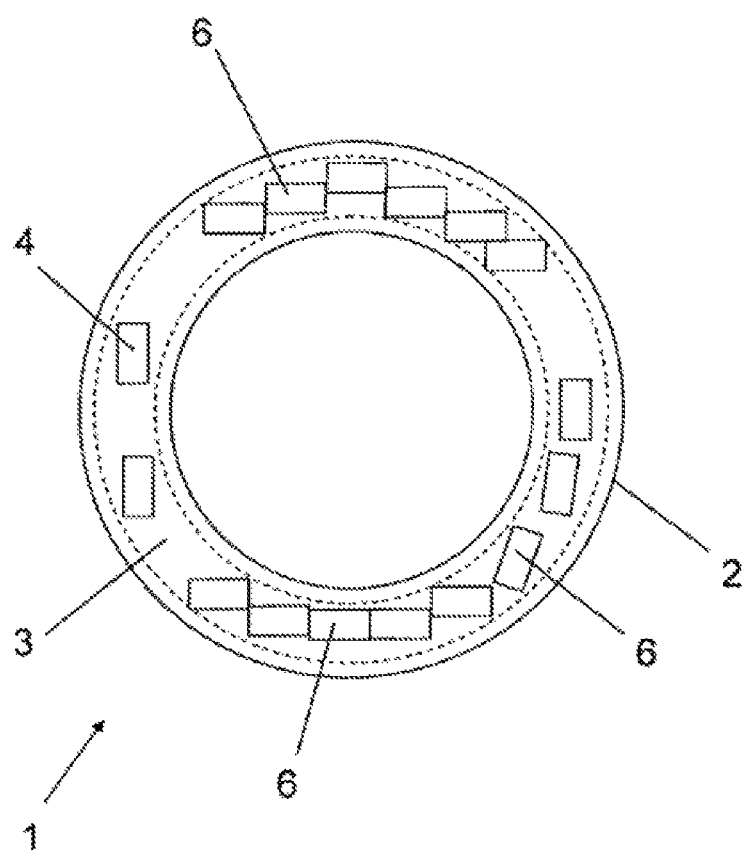
Figure 4A:
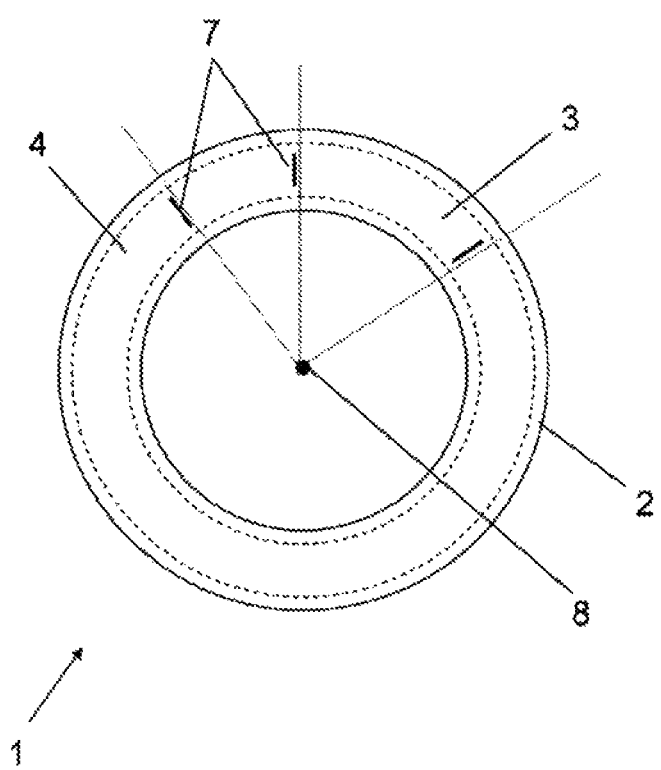
Figure 4B:
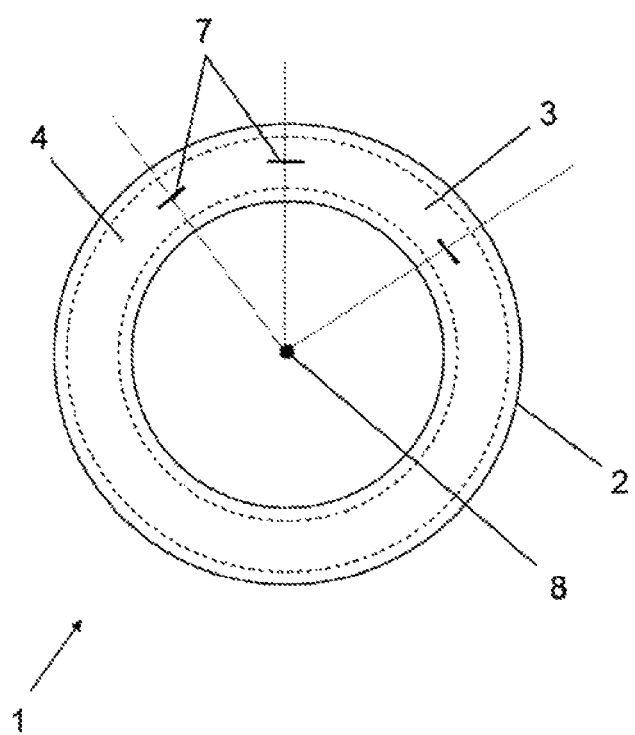
Figure 4C:
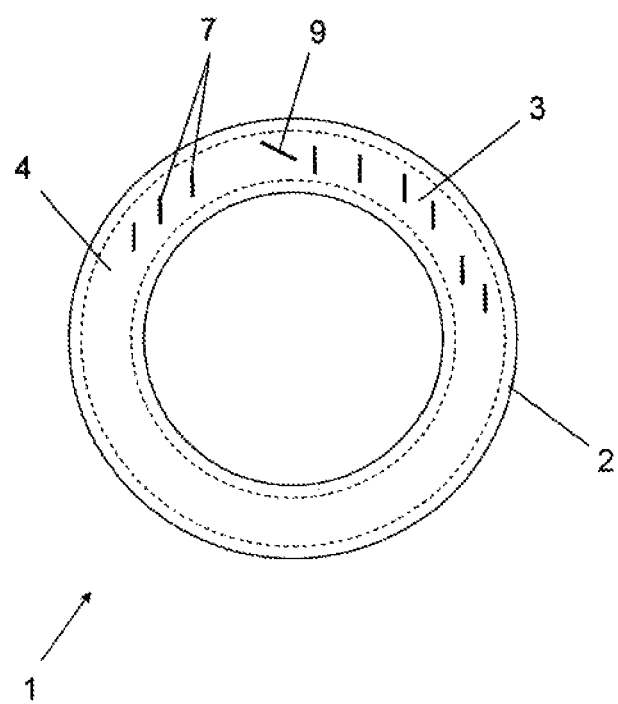
Figure 5:
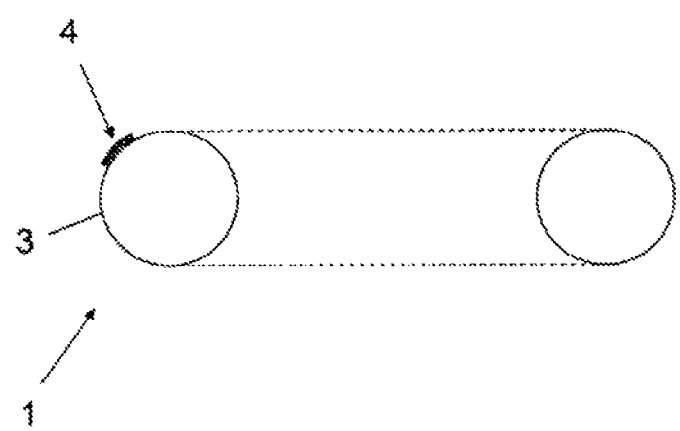

FIG. 1 schematically shows a component designed as an O-ring;

FIG. 2 schematically shows a component with an identification with an uneven limiting edge;

FIG. 3 schematically shows a component with a segmented identification;

FIG. 4a schematically shows a component with an identification containing symbols rotated toward each other;

FIG. 4b schematically shows a component with an identification containing symbols rotated toward each other;

FIG. 4c schematically shows a component with an identification containing symbols offset from each other;

FIG. 5 schematically shows the component according to FIG. 1 in cross section.

Corresponding reference numerals indicate corresponding parts throughout the several views of the drawings.

DETAILED DESCRIPTION

Example embodiments will now be described more fully with reference to the accompanying drawings.

FIG. 1 shows a component 1, here an O-ring, having a circular cross-section taken along a plane aligned with a center axis of the O-ring. The circular cross-section of the O-ring 1 being continuous and uniform around an entire circumference of the O-ring 1, as shown in FIG. 1.. The component consists of an element 2 of elastomeric material with a curved surface 3 onto which a coded, electronically readable identification 4 is applied that is introduced into the surface as topographic identification 4. Identification 4 is formed in such a manner that it can be read out in two dimensions with a reader. To this end identification 4 has a non-rectangular shape and an uneven limiting edge 5. In this embodiment identification 4 is circular and extends in a range of the surface with an extension in the circumferential direction so that only slight distortions occur in the edge areas and identification 4 can be read out with a simple reader. The width of identification 4 is preferably selected in such a manner that it maximally corresponds to 0.8 times the diameter of element 2. Such an identification 4 is basically conceivable on all possible curved elements 2. Thus, element 2 can be, for example, part of the sealing element or of an elastomeric form part.

FIG. 2 shows a component 1 according to FIG. 1, whereby limiting edge 5 of identification 4 is designed in this embodiment as a "freehand line" and has an especially uneven course. Identification 4 can also be arranged in the form of symbols or graphic elements. Identification 4 is positioned in an area of element 2 that causes only a slight distortion.

FIG. 3 shows a component 1, here an O-ring. The component consists of an element 2 of elastomeric material with a curved surface 3 on which a coded, electronically readable identification 4 is applied that is introduced into the surface as a topographical identification 4. Identification 4 is formed in such a manner that it can be read out in two dimensions with the reader. To this end identification 4 is divided into segments 6, whereby part of segments 6 directly border each other and part of segments 6 are distanced from each other. Furthermore, segments 6 are offset relative to each other and are in part aligned rotated relative to each other.

FIGS. 4*a*, 4*b* and 4*c* show a component 1, here an O-ring. Component 1 consists of an element 2 of elastomeric material with a curved surface 3 onto which a coded, electronically readable identification 4 is applied that is introduced as topographical identification 4 into the surface. Identification 4 is formed in such a manner that it can be read out in two dimensions with a reader. Identification 4 contains individual readable symbols 7. In the exemplary embodiment according to FIG. 4*a* symbols 7 are aligned like rays from a common middle point 8 and in the exemplary embodiment according to FIG. 4*b* they are aligned tangentially to a common middle point 8. FIG. 4*c* shows an exemplary embodiment in which symbols 7 are arranged offset relative to each other. Here, symbols are shifted in parallel inside identification 4. A reference symbol 9 improves the readability.

FIG. 5 shows the arrangement of identification 4 on an element, here an O-ring, in an intermediate area between axial and radial sealing surfaces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An elastomeric O-ring seal (2) with a curved surface (3) and a circular cross-section taken along a plane aligned with a center axis of the O-ring, said circular cross-section being continuous and uniform around an entire circumference of the O-ring, whereby the O-ring (2) is provided with a coded, electronically readable identification (4) that is introduced as a topographical identification into the surface, wherein the identification (4) is formed in such a manner that it can be read out in two dimensions with a reader.

2. The O-ring seal according to claim 1, wherein the identification (4) has a non-rectangular shape.

3. The O-ring seal according to claim 1, wherein the identification (4) has an uneven limiting edge (5).

4. The O-ring seal according to claim 1, wherein the identification (4) is divided into segments (6).

5. The O-ring seal according to claim 4, wherein the segments (6) directly border each other or are distanced from each other.

6. The O-ring seal according to claim 4, wherein the segments (6) are aligned to offset relative to each other.

7. The O-ring seal according to claim 4, wherein the segments (6) are aligned rotated relative to each other.

8. The O-ring seal according to claim 1, wherein the identification (4) contains individual readable symbols (7) arranged offset relative to each other.

9. The O-ring seal according to claim 6, wherein the identification (4) contains individual readable symbols (7) arranged around a common middle point (8).

10. The O-ring seal according to claim 1, wherein the identification (4) extends over several elements (2) of the component (1).

11. A sealing element (1) designed to provide a seal between two relatively movable annular surfaces and including at least one annular elastomeric section (2) with a curved surface (3) the annular elastomeric section having a uniform cross-section around its entire circumference, whereby the elastomeric section (2) is provided with a coded, electronically readable identification (4) that is introduced as a topographical identification into the surface, wherein the identification (4) is formed in such a manner that it can be read out in two dimensions with a reader.

12. The sealing element according to claim 11, wherein the identification (4) has a non-rectangular shape.

13. The sealing element according to claim 11, wherein the identification (4) has an uneven limiting edge (5).

14. The sealing element component according to claim 11, wherein the identification (4) is divided into segments (6).

15. The sealing element according to claim 14, wherein the segments (6) directly border each other or are distanced from each other.

16. The sealing element according to claim 14, wherein the segments (6) are aligned to offset relative to each other.

17. The sealing element according to claim 14, wherein the segments (6) are aligned rotated relative to each other.

18. The sealing element according to claim 11, wherein the identification (4) contains individual readable symbols (7) arranged offset relative to each other.

19. The sealing element according to claim 16, wherein the identification (4) contains individual readable symbols (7) arranged around a common middle point (8).

* * * * *